Figure 1:
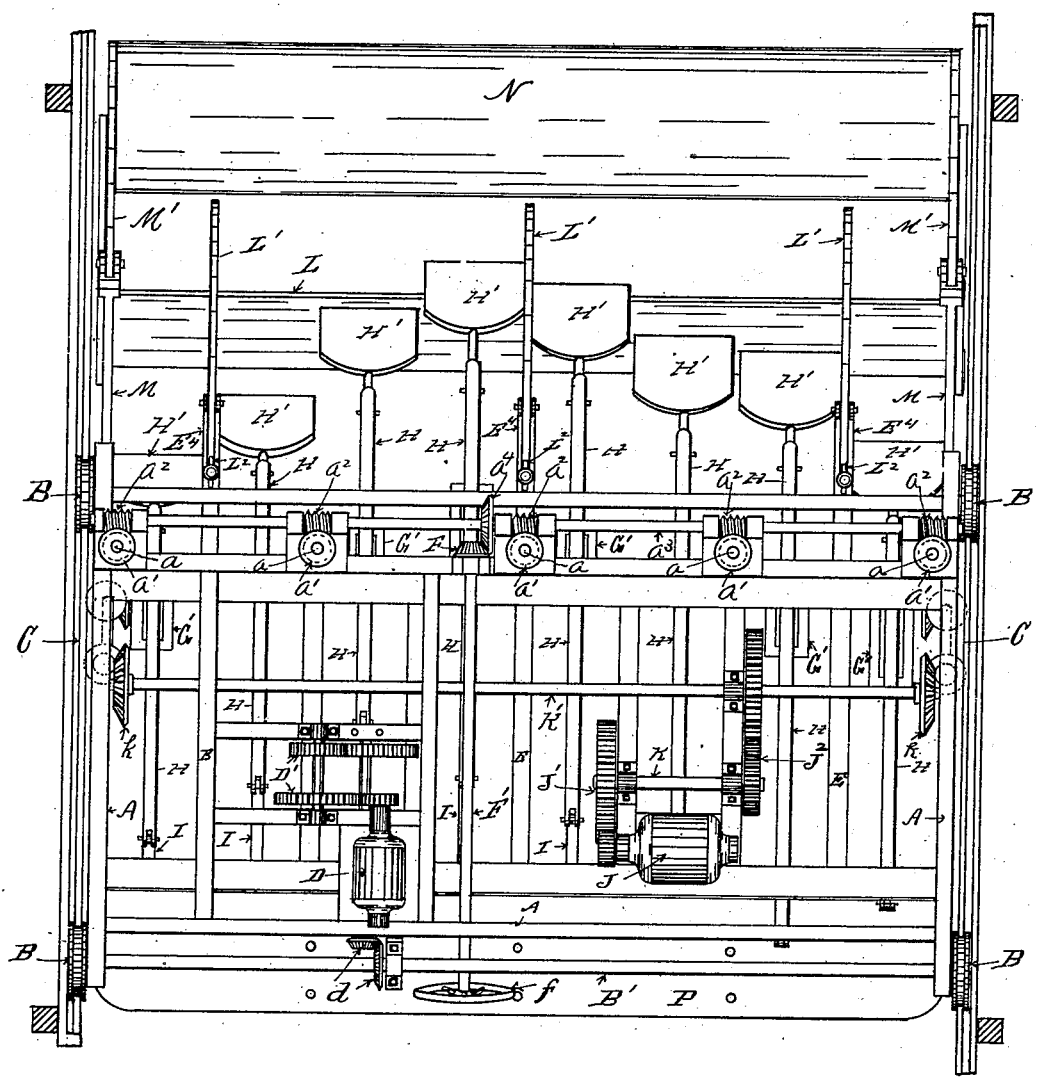

No. 722,785. PATENTED MAR. 17, 1903.
D. D. WESCHLER.
MALT TURNING MACHINE.
APPLICATION FILED NOV. 20, 1902.
NO MODEL. 3 SHEETS—SHEET 1.

Witnesses.
F. J. Bassett
G. J. Mead

Inventor.
Daniel D. Weschler.
By J. C. & H. M. Sturgeon
Attys.

No. 722,785. PATENTED MAR. 17, 1903.
D. D. WESCHLER.
MALT TURNING MACHINE.
APPLICATION FILED NOV. 20, 1902.
NO MODEL. 3 SHEETS—SHEET 2.

Witnesses.
F. J. Bassett
G. J. Mead

Inventor.
Daniel D. Weschler.
By J. C. & H. M. Sturgeon.
Atty's.

No. 722,785. PATENTED MAR. 17, 1903.
D. D. WESCHLER.
MALT TURNING MACHINE.
APPLICATION FILED NOV. 20, 1902.
NO MODEL. 3 SHEETS—SHEET 3.
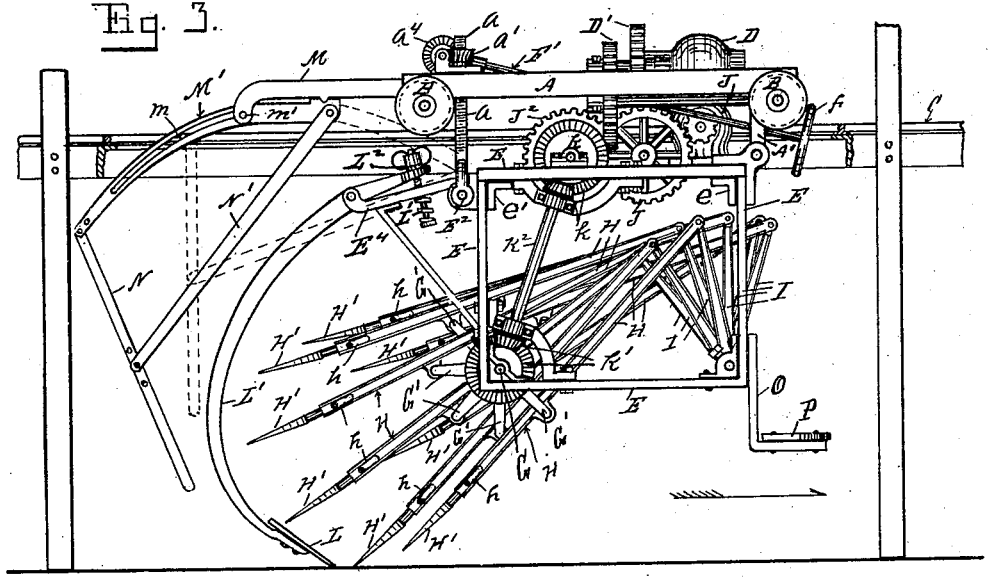
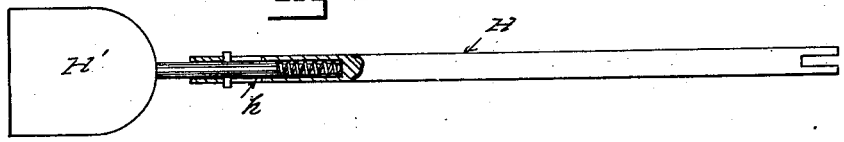
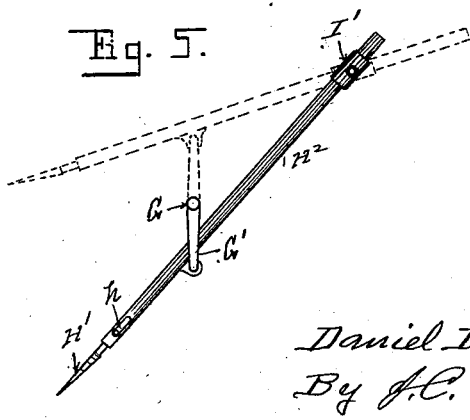
Witnesses.
Inventor.
Daniel D. Weschler
By J. C. & H. M. Sturgeon
Attys.

UNITED STATES PATENT OFFICE.

DANIEL D. WESCHLER, OF ERIE, PENNSYLVANIA.

MALT-TURNING MACHINE.

SPECIFICATION forming part of Letters Patent No. 722,785, dated March 17, 1903.

Application filed November 20, 1902. Serial No. 132,117. (No model.)

*To all whom it may concern:*

Be it known that I, DANIEL D. WESCHLER, a citizen of the United States, residing at Erie, in the county of Erie and State of Pennsylvania, have invented certain new and useful Improvements in Malt-Turning Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to malt-turning mechanism, and has for its object the production of a machine adapted to travel on ways over a malting-floor and turn the grain thereon.

Grain is ordinarily malted by first saturating it with water and then spreading it upon a malting-floor to the depth of approximately six inches, where it is allowed to germinate. During the process of germination it is necessary to frequently turn the grain, so as to insure uniform germination throughout the whole mass and prevent the lower portions of it from becoming unduly heated, and thereby deteriorated. This work is ordinarily done by manual labor by shovelers skilled in this line of work.

In view of the problem to be solved in producing a machine which will successfully turn germinating grain on a malting-floor I have devised a machine consisting substantially of a crane or frame traveling on tracks and adapted to be propelled thereon back and forth over a malting-floor. Mounted on said crane or frame there are a series of reciprocating shovels actuated by suitable motive power, a follower traveling over the floor in the rear of and adjacent to the point of contact of the shovels therewith, and a screen or apron against which the grain is thrown by the shovels and from which it falls back upon the floor behind the follower, so as to evenly distribute it thereon.

The features of this invention are hereinafter fully set forth and explained, and illustrated in the accompanying drawings, in which—

Figure 2:
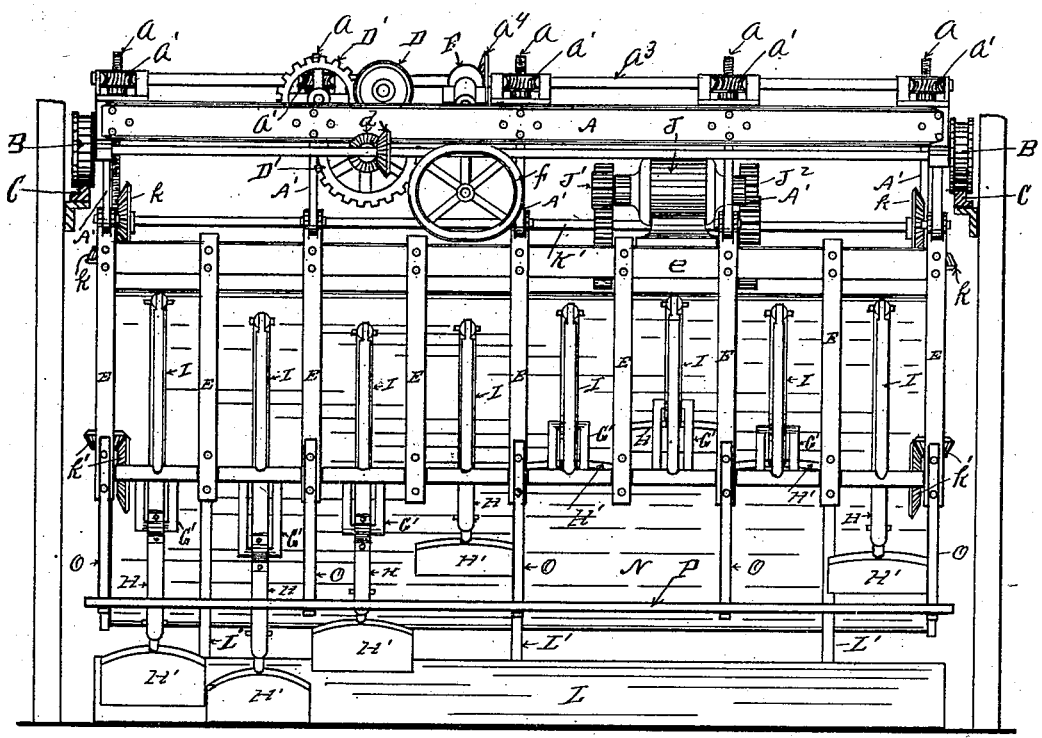

Figure 1 is a top or plan view of a malt-turning machine embodying my invention. Fig. 2 is a front view in elevation of the same. Fig. 3 is a side view in elevation of the same. Fig. 4 is a detail view of one of the shovels used in my machine with parts thereof broken away. Fig. 5 is a detail of a modified construction of the shovel-operating mechanism.

In the drawings illustrating my invention, A is a crane, mounted upon wheels B at the corners thereof, adapted to travel over tracks C C. For actuating the crane A on the tracks C C any suitable motive power can be used; but I preferably mount an electric motor D, Fig. 1, thereon and connect the same by means of suitable gearing $D'$ $d$ with one of the shafts $B'$ of the crane-wheels B. Upon this crane A, I secure a frame consisting, preferably, of sections E, Fig. 3, secured at suitable distances apart to longitudinal bars $e$ $e'$ at the front and rear upper corners thereof, so that the sections E and the longitudinal bars $e$ $e'$ form one integral frame. The front upper corner $E'$ of this frame I preferably pivot to arms $A'$, extending downwardly from the front of the crane A, and the rear upper corner $E^2$ of this frame I pivot to suspending-screws $a$, which extend upward and are provided with worm-wheel nuts $a'$ on the top of the crane A, adapted to be operated by worm-screws $a^2$ on a shaft $a^3$, mounted on the crane, which shaft is rotated by means of a bevel-gear $a^4$ thereon intermeshing with a bevel-gear F, Fig. 2, on a shaft $F'$, Fig. 1, mounted on the crane A and provided with a hand-wheel $f$, whereby the operator can raise and lower the rear of the frames E, together with the mechanism hereinafter described as mounted and operating therein, as he may desire. Upon the lower rear corners of the frames E, I mount a crank-shaft G, Figs. 3, 5, provided with a crank $G'$ between each pair of frames E. These cranks $G'$ are preferably set at an angle to each other, and on each of said cranks I mount a shovel-handle H, having its rear end preferably pivoted to a rock-arm I, pivoted in the lower part of the frames E. On the lower end of each handle H there is a shovel $H'$, preferably connected with the handle H by means of a spring-actuated telescopic joint $h$, as clearly shown in Fig. 4, so that when in operation the edge of the shovel $H'$ contacts with the malting-floor the joint $h$ will yield somewhat and prevent breakage and at the same time allow the shovel to travel along the floor some distance before leaving it.

For actuating the shaft G, I preferably mount an electric motor J on the frames E and connect the same by means of gearing J' J², shafts K, K', and K², and, Fig. 1, bevel-gearing k k', whereby the shaft G is rotated so that the shovels H', actuated by the cranks G', will alternately be reciprocally moved down to the floor and forward and upward. Behind and at the point at which the shovels H' leave the floor there is an inclined follower L, Fig. 3, suspended upon curved arms L', pivoted to fixed arms E⁴, extending outward from the top of the frames E, and provided with screw and spring adjustments L², so that the follower L can be adjusted relatively to the frames E as desired. This follower L travels along the floor as the machine moves forward in the direction of the arrow in Fig. 3 and operates to prevent grain from being pushed backward along the floor by the shovels H' instead of being raised and thrown upward and backward thereby.

On extensions M, Fig. 3, extending from the rear of the crane A, I mount curved arms M', provided with slots m therein, through which pivots m' in the ends of the extensions M pass. On the outer ends of the curved arms M', I secure the upper edge of an inclined apron N, which is also connected with the inner ends of the arms M' by means of braces N', so that when the machine is in operation the apron N is firmly held in the desired position; but when desired the slots m in the arms M' enable the arms M', apron N, and brace N' to be moved toward the machine, as illustrated in dotted lines in Fig. 3. This apron N operates to receive the grain as it is thrown upward by the shovels H' and stop it so that it will fall back again upon the floor in a uniform layer behind the follower L.

Across the front of the machine upon hangers O, secured to the frames E, there is a footboard P, upon which the operator stands and controls the operation of the machine.

In Fig. 5 I show a detail of a modified construction of the shovel-mounting mechanism, in which the shovel H' and crank G' for operating it are the same as hereinbefore described; but the upper end of the shovel-handle H² instead of being pivoted to a rock-arm, as hereinbefore described, extends through a trunnioned sleeve I', in which the upper end of the shovel-handle H² slides freely as the crank G rotates. I, however, prefer the construction embodying the rock-arm I, pivoted to the end of the shovel-handle H, as hereinbefore described, as the most desirable in practice.

In operation the operator stands on the footboard P, from which point he operates, by means of a switch of ordinary construction, (not shown,) the reversible electric motor D, which is geared, by means of gearing D' d, to the shaft B', operating the wheels B B on the tracks C C, which operates to propel the machine forward or backward, as may be desired. The machine being at the rear end of the malting-floor, its rear end is lowered by means of the hand-wheel f and the mechanism operated thereby until the follower L contacts with the malting-floor, after which the machine is started forward and simultaneously therewith the motor J is started, which through the gearing J' J², shaft K', bevel-gears k k, and shafts K², and bevel-gears k' operates the shaft G, and by means of the cranks G' the shovels H' are actuated to raise the grain from the floor and throw it up against the screen N, from whence it falls back upon the floor behind the follower L, as hereinbefore indicated.

I have thus shown and described mechanism embodying my invention and the operation thereof sufficiently in detail so that those skilled in the art to which it appertains will readily understand its construction and operation. I do not, however, desire to limit myself to the particular forms of construction and arrangement of the parts of the mechanism, as it is clearly obvious that many such modifications can be made in the mechanism without departing from the spirit of my invention.

Therefore what I claim as new, and desire to secure by Letters Patent of the United States, is—

1. In a malt-turning machine, a frame capable of being moved over a malting-floor, mechanism for actuating the same, reciprocating shovels and mechanism operating the same supported by said frame, and a follower at the rear of and adjacent to the line of contact of the shovels with the malting-floor, substantially as set forth.

2. In a malt-turning machine, a frame capable of being moved over a malting-floor, mechanism for actuating the same, reciprocating shovels and mechanism operating the same supported by said frame, and an apron at the rear of the shovels, substantially as set forth.

3. In a malt-turning machine, a crane traveling over a malting-floor, mechanism for actuating said crane, a framework mounted on said crane, reciprocating shovels and mechanism for actuating the same mounted on said frame, a follower traveling with said frame at the rear of and adjacent to the line of contact of the shovels with the malting-floor, and an apron suspended above the floor at the rear of the shovels, substantially as set forth.

4. In a malt-turning machine, a crane traveling on tracks over a malting-floor, mechanism for actuating the same, a framework adjustably suspended upon said crane, reciprocating shovels and means for actuating them mounted upon said frame, a follower mounted upon said frame and contacting with the floor behind and adjacent to the line of contact of the shovels with the malting-floor, and an apron mounted upon the crane behind the shovels and above the malting-floor, substantially as set forth.

5. In a malt-turning machine, a crane traveling on tracks over a malting-floor, mechanism thereon for operating the crane, a framework suspended upon said crane, means for adjusting the relations of the framework to the crane, reciprocating shovels mounted in said frame, mechanism on said frame for actuating said shovels, a follower mounted on said frame and contacting with the malting-floor at the rear of the point of contact of the shovels therewith, means for adjusting the same thereon, an apron mounted on said crane so as to be above the malting-floor at the rear of the traverse of the shovels, and means for adjusting the same with relation to the machine, substantially as set forth.

6. In a malt-turning machine, a crane adapted to travel on elevated tracks over a malting-floor, motor mechanism mounted thereon and actuating it, a framework pivotally suspended from said crane, means for vertically adjusting the rear of said frame relatively to the crane, a crank-shaft mounted in said frame, a series of cranks thereon, motor mechanism on said frame operating said crank-shaft, a shovel-handle mounted intermediate of its length on each of the cranks on said crank-shaft, means for pivotally supporting the upper ends of the shovel-handle, shovels on the lower ends of said handles, a follower mounted on said frame and contacting with the malting-floor at the rear of and adjacent to the point of contact of the shovels therewith, means for adjusting said follower with relation to the frame, and an apron suspended on the crane above the malting-floor at the rear of the traverse of the shovels, substantially as set forth.

7. In a malting-machine, a crane adapted to travel on elevated tracks over a malting-floor, electric motor mechanism on said crane for actuating it upon said tracks, a framework comprised substantially of a series of hanger-frames secured together at their tops and pivotally suspended upon said crane, a crank-shaft mounted therein, a crank on said crank-shaft between each pair of said hanger-frames, a shovel-handle mounted on each crank intermediate of the length of the handle, rock-arms mounted between the pairs of said hanger-frames and pivoted to the upper ends of the shovel-handles, shovels on the lower ends of said handles, electric motor mechanism mounted on said frame and operating said crank-shaft, a follower contacting with the malting-floor at the rear of and adjacent to the point of contact of the shovels therewith, an apron at the rear of the traverse of the reciprocating shovels, and means for adjusting said apron relatively to the other parts of the machine, substantially as set forth.

8. In a malt-turning machine, a crank-shaft, a shovel-handle mounted thereon intermediate of its length, a pivoted support for the upper end of the handle, a spring-actuated sliding section on the lower end of the handle, and a shovel mounted thereon, substantially as set forth.

9. In a malt-turning machine, a crank-shaft, a series of cranks thereon at different angles to each other, a shovel-handle mounted intermediate of its length upon each of said cranks, a pivotal support for the upper end of each handle, and a shovel on the lower end of each of said handles, substantially as set forth.

10. In a malt-turning machine, a framework adapted to travel over a malting-floor, mechanism thereon for raising the grain from the floor, and an apron for receiving the grain when raised and from which it will fall back upon the floor, substantially as set forth.

In testimony whereof I affix my signature in presence of two witnesses.

DANIEL D. WESCHLER.

Witnesses:
F. J. BASSETT,
H. M. STURGEON.